Sept. 27, 1966   G. M. PAVEY, JR   3,275,097
MARINE SEISMIC CABLE SYSTEM
Filed June 17, 1964   2 Sheets-Sheet 1

INVENTOR
GEORGE M. PAVEY, JR.

BY R. M. Hicks
ATTORNEY

Sept. 27, 1966  G. M. PAVEY, JR  3,275,097

MARINE SEISMIC CABLE SYSTEM

Filed June 17, 1964  2 Sheets-Sheet 2

INVENTOR
GEORGE M. PAVEY, JR.

BY  R. M. Hicks

ATTORNEY

United States Patent Office 3,275,097
Patented Sept. 27, 1966

3,275,097
MARINE SEISMIC CABLE SYSTEM
George M. Pavey, Jr., Dallas, Tex., assignor to Sonic
Engineering Company, Dallas, Tex.
Filed June 17, 1964, Ser. No. 375,718
12 Claims. (Cl. 181—.5)

This invention relates generally to a marine seismic cable system and more particularly to a flexible detector streamer system for surveying subsurface geological formations in water covered areas in which new and improved means are employed for preventing substantial lateral displacement or drift of the streamer, as the result of cross currents or tidal effects, from the predetermined course of the towing vessel as the streamer is towed thereby in a submerged condition within the water.

It has been the usual practice, heretofore, in modern systems of this character such, for example, as the system entitled Water Borne Means for Making Seismic Surveys disclosed in Patent 2,729,300 to L. C. Paslay et al., issued January 3, 1956, and in the system for Method and Means for Surveying Geological Formations disclosed and claimed in Patent 2,465,696, issued March 29, 1949, to LeRoy C. Paslay to receive the seismic signals by a plurality of pressure responsive detectors disposed within a streamer and towed through the water in a submerged condition by a vessel. While such systems have been generally satisfactory in service, they are adversely affected by cross currents within the water or tidal effects which may cause the towed detection streamer to be displaced laterally from the predetermined course of the vessel to such a degree that the seismic signals received thereby are reflected from subaqueous geological formations which are disposed not directly beneath the path of travel of the vessel but at a considerable lateral distance therefrom. The map of the subbottom strata, therefore, may be lacking in accuracy in proportion to the degree of lateral departure or drift of the detector streamer from the course of the vessel at the time that the seismic signals are received.

In the system of the Paslay et al. Patent 2,729,300 supra the detection streamer is towed near the bottom where the cross currents are usually somewhat weaker than near the surface but the adverse effect of these currents on the streamer is augmented by the plurality of weights 26 suspended therefrom at intervals along the length of the streamer which increase the lateral drag due to transverse water action thereon.

One of the objects of the present invention is to provide a marine seismic cable system towed by a vessel along the bed of a body of water in which new and improved means are provided for causing the detection streamer cable to follow in a line described as the course or line of travel of the vessel regardless of the influence of strong cross currents acting thereon. The means by which this desirable object is achieved will be more clearly apparent as the description proceeds.

Another of the objects of the present invention is to provide new and improved means for increasing the resistance to lateral drift of an elongated flexible detection streamer towed in a cross current by a vessel.

Another of the objects is to provide a length of flexible seismic detector streamer adapted to be towed by a vessel along the bottom or bed of a body of water and having a plurality of devices secured thereto at intervals in continuous engagement with the bottom for preventing lateral motion with respect thereto or drift from a line described as the course of the vessel in response to the action of a cross current.

A further object is to provide a plurality of vehicles each having runners in continuous tracking engagement with the bed of a body of water and attached at intervals to a detector streamer for preventing substantial lateral drift thereof from a line described as the course of the vessel in response to a cross current as the streamer is towed through the water by a vessel.

A still further object is to provide a plurality of wheeled vehicles secured to a flexible seismic detector streamer cable at intervals and in continuous engagement with the bed of the body of water for preventing appreciable lateral drift of the streamer from a line defining the course of the vessel in response to cross currents as the streamer is towed by a vessel along a predetermined course.

Still another object is the provision of new and improved means secured at intervals to a seismic detection streamer and continuously furrowing the bed of a body of water for maintaining the entire length of the streamer continuously within a line defining the path of travel of the vessel as the vessel tows the streamer along a predetermined course.

Still other objects, advantages, and improvements will be apparent from the following description when taken in connection with the appended drawings of which:

Figure 1:
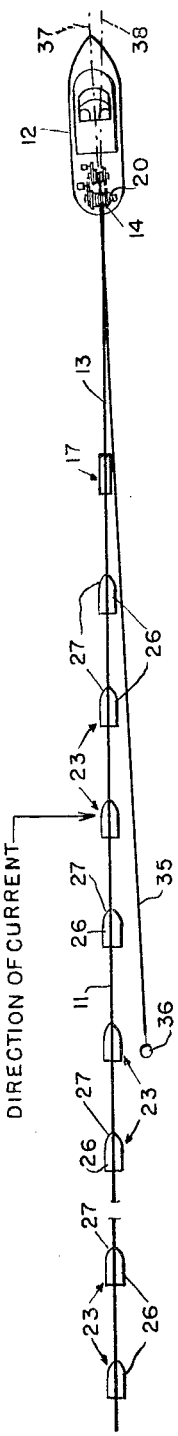
FIG. 1 is a diagrammatic plan view of a seismic detection streamer system employing the present invention and being towerd in a cross current by a vessel.
Figure 2:
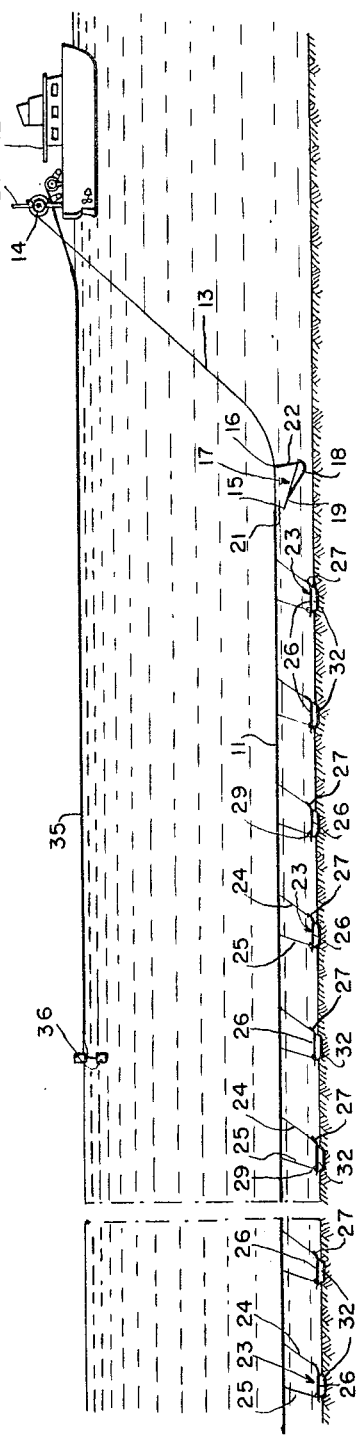
FIG. 2 is a view in elevation of the system of FIG. 1 with the towing force applied to the streamer.
Figure 3:
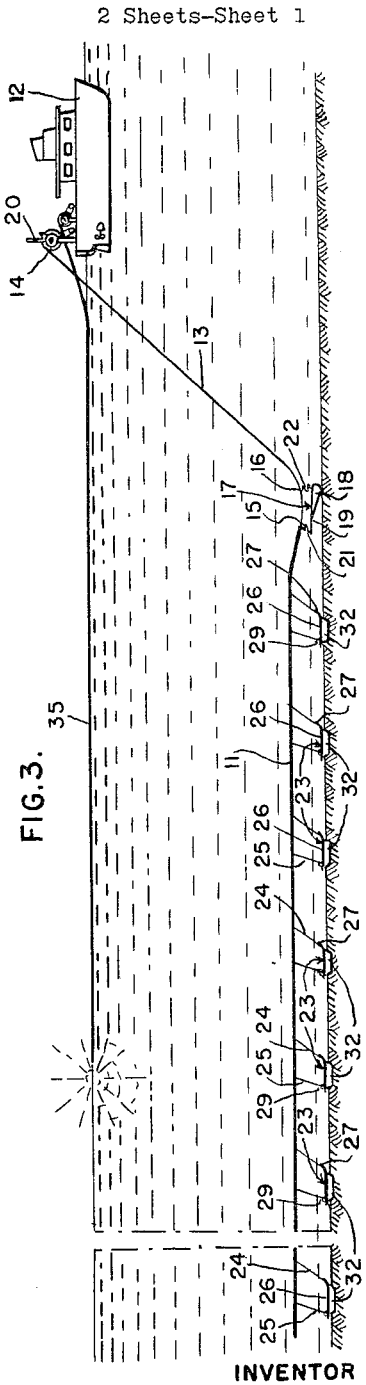
FIG. 3 is a view similar to FIG. 2 with the towing force removed from the streamer and at the instant a shot is fired.

Referring now to the drawings for a more complete understanding of the invention on which like numerals of reference are employed to designate like parts throughout the several views and more particularly to FIG. 1 thereof, there is shown thereon in diagrammatic form a plan view of a preferred embodiment of the system of the present invention, the system comprising a detection cable or streamer indicated generally by the reference numeral 11 towed by a vessel 12 near the bed of the body of water. The streamer is provided with a lead-in or tow cable 13 adapted to be payed out, arrested and hauled in at will by a reel 14 on the vessel for establishing a towing connection between the streamer and the vessel. Secured to the lead-in 13 at the head end of the detection streamer at points 15 and 16 is a depressor 17 for maintaing the head end of the tow cable at a depth of submersion near the bed of the body of water and for momentarily arresting forward movement of the head end of the detection streamer at intervals, as will be more clearly apparent as the description proceeds. The tail end of the detection streamer is connected preferably but not necessarily to a drogue of sufficient weight to maintain the tail end of the detection streamer in continuous contact with the bed of the water while seismic prospecting operations are in progress. The detection streamer 11 may be of any type suitable for the purpose and adapted to be towed along the bottom such, for example, as the detection streamer disclosed and claimed in Patent 2,729,300 for Water Borne Means for Making Seismic Surveys, issued January 3, 1956, to LeRoy C. Paslay et al. in which are arranged at intervals throughout the length thereof a plurality of seismic detecting devices interspaced with a plurality of annular floats fitted and sealed within an oil filled length of flexible tubing and secured to a plurality of strain cables extending interiorly throughout the length of the streamer. With this type of detection streamer an arrangement is thus provided in which the towing strain is applied not only to the head end of the detection streamer but also by way of the strain cables to a plurality of points along the streamer by reason of the snug fitting of the floats and microphone casings within the flexible tubing of which the streamer is composed. When employed with the present invention the detection streamer like the detection streamer of Patent 2,729,300 supra is preferably slightly positively buoyant when the bottom engaging devices of the present invention are not connected thereto. The term "positively buoyant" as employed herein may be defined as a condition in which the weight of the fluid displaced by an object completely immersed therein is greater than the weight of the object.

The depressor 17 is generally similar to the depressor of Patent 2,729,300 and preferably comprises a steel shell 18 filled with a mass of heavy metal such as lead. The depressor is also provided with a rearwardly extending portion 19 having a loop or eye on the trailing end thereof for connection to the lead-in cable, as by the line 21. The depressor is also provided at the forward end portion thereof with a bridle 22 having the mid-point thereof connected to the lead-in cable 13 as at 16. The lead-in cable 13 is wrapped around the power reel 14 having a motor operatively connected thereto and a clutch 20 operable at will for releasing the reel sufficiently to thereby pay out suddenly a length of tow cable 13 and thus cause the depressor 17 to sink to the bottom and come to rest before the explosive shot is fired.

The detector streamer or cable 11 may be of any suitable length such as 3600 feet and is provided with a plurality of vehicles indicated generally by the numeral 23 secured thereto at approximately 100 foot intervals by the relatively short lines 24–25 secured at one end to the streamer and at the other end thereof to the forward and trailing end portions respectively of the vehicle in any convenient manner substantially as illustrated.

Figure 4:
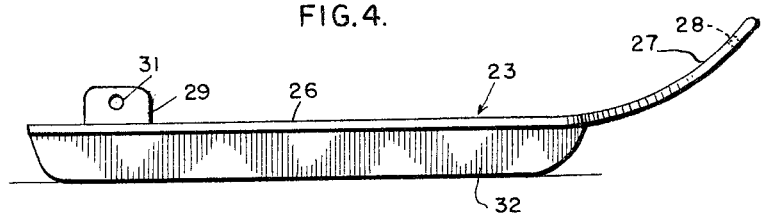
FIG. 4 is a view in elevation of one of the sleds of FIG. 1.
Figure 5:
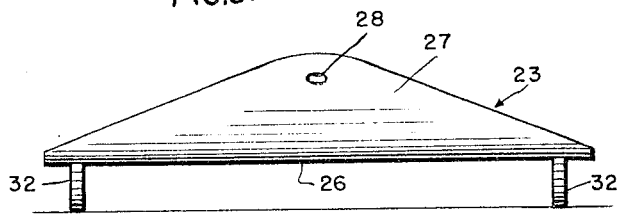
FIG. 5 is an end view of the device of FIG. 4.
Figure 6:
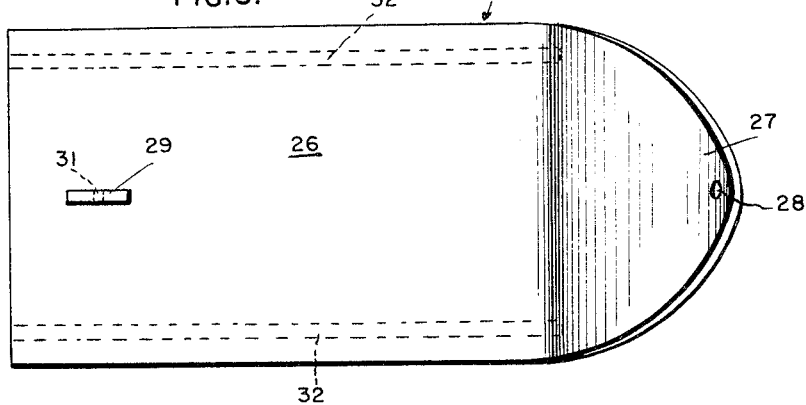
FIG. 6 is a plan view of the device of FIG. 4.

The vehicle according to a preferred embodiment of the invention may assume the form of a sled as illustrated in FIGS. 4–6 composed of metal suitable for the purpose such, for example, as stainless steel or the like and having a generally flat body portion 26 and an upwardly curved forward or bow portion 27 with an eye 28 formed therein for establishing a connection to the line 24. The aft portion of the body 26 is provided with an upstanding tab or block 29 having an eye 31 formed therein for connection to the line 25. The sled is provided with a pair of runners 32 projecting downwardly therefrom and secured to the sled body 26 in any suitable manner or, if desired, the runners may be formed integral with the sled bottom 26 by bending the outer lateral edge portions of the bottom downwardly.

In either case, the sled should be sufficiently heavy to cause the runners to engage and cut into the bottom continuously and sufficiently to prevent lateral motion or side slip by the pull of the streamer thereon in response to a cross current as the sled is towed along the ocean bottom and during the time that forward movement of the streamer is arrested while seismic signals are received thereby. If desired, additional weights may be carried by the sled to achieve this result.

Figure 7:
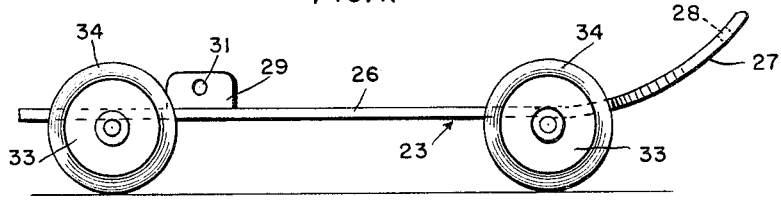
FIG. 7 is a side view of the vehicle of FIG. 4 in accordance with an alternative form of the invention.
Figure 8:
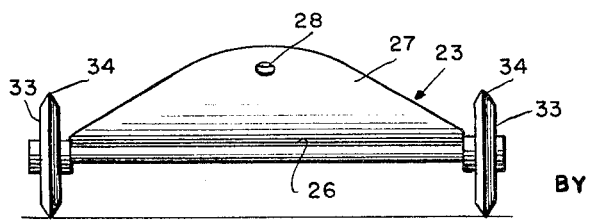
FIG. 8 is an end view of the device of FIG. 7.

On FIGS. 7–8 is shown a bottom engaging vehicle according to an alternative form of the invention which is well adapted for use with a detection streamer in areas having a hard ocean bottom. This vehicle differs from the device of FIG. 4 in the replacement of the runners 32 by a plurality of wheels 33 mounted for rotation on transverse bearings at the fore end aft portions of the vehicle substantially as shown. The wheels, if desired, may be provided with an outwardly extending V shaped tread 34 to facilitate engagement with the ocean bottom and thereby prevent substantial side slippage as the vehicle is traveled along a predetermined course by the detection streamer. It will be understood that, if desired, the wheels may be configured other than as shown, for example, the tread of the wheels may comprise two V-shaped portions provided by an inverted V notched peripheral portion formed therebetween, the wheels may comprise a single outwardly formed flange similar to the wheels of a railroad car, or the treads may be flat in transverse section and preferably relatively narrow. Regardless of the particular type of wheel employed, the wheeled vehicle shall have sufficient weight to remain continuously in contact with and engage the ocean bottom sufficiently to prevent substantial lateral movement of the vehicle from the predetermined course of the towing vessel. It is contemplated that sufficient weights may be added, if necessary, to the vehicle to achieve this result particularly in the presence of strong cross currents.

A firing line 35 suitable for use with the present invention having an explosive charge 36 connected thereto is employed to originate a seismic impulse as the charge is fired when the streamer has been brought to rest. If desired, the firing line may be connected to a pivoted boom or outrigger carried by the vessel and projecting outwardly therefrom in a lateral direction toward the upstream whereby the explosive charge connected thereto will drift to a position more nearly directly above the center portion of the detection streamer, as the explosive shot is fired. Such a boom arrangement is disclosed and claimed in the Paslay Patent 2,465,696 supra. A second boom on the opposite side of the vessel would be employed when the direction of the cross current is reversed with respect to the direction of movement of the vessel. Since the firing line and explosive charge, per se, form no part of the present invention a further description thereof is deemed unnecessary.

It should be noted, however, that the vessel 12 is required to head in the direction of line 37, FIG. 1, in order to maintain a predetermined course as indicated by the line 38 as a result of the cross current bearing on the vessel from the port side thereof. The vessel thus is headed at an angle from the true course thereof. The bottom engaging devices of the present invention cause the detection streamer to follow the true course of the vessel instead of being carried downstream by the cross current and the seismic signals received thereby correspond to subaqueous geological formations correlative with the vessel's course and therefore reproducible with a high degree of accuracy on the seismic map of the subbottom terrain.

Whereas the invention has been described and illustrated with particular reference to a single boat seismic system, it may be advantageously employed with a multiple boat system in which the detection cable is towed from one boat and the firing of the explosive charge is done from one or more other boats. Furthermore, the towing force can be removed from the detection streamer by stopping forward movement of the vessel momentarily in lieu of suddenly paying out an additional length of cable during a recording operation. If desired, a floating marker may be payed out and towed from an outrigger or boom carried by the vessel on the upstream side to facilitate the location of the explosive charge as the charge is fired by the explosive carrying boat.

While the invention has been described with particular reference to several embodiments thereof which give satisfactory results, it is not so limited as it will be understood by those skilled in the art to which the invention pertains, after understanding the invention, that various changes and modifications may be made and various instrumentalities may be employed without departing from the spirit and scope of the invention and it is my intention, therefore, in the appended claims to cover all such changes, modifications and instrumentalities.

What I claim as new and desire to secure by Letters Patent of the United States is:

1. In a waterborne system for seismic prospecting for geological structures disposed beneath a body of water, in combination,
  (1) a positively buoyant elongated flexible streamer having a plurality of detecting devices disposed at intervals therein,
  (2) a flexible lead-in cable connected to the head end of the streamer for effecting a towing connection to a moving vessel,
  (3) means on the vessel for applying a towing force to said connection while the vessel is moving along a course and for removing said towing force at will,
  (4) a depressor connected to said cable at the head end of the streamer for maintaining the head end of the streamer near the bottom of the body of water while the streamer is being towed, said depressor having sufficient mass to sink and anchor the head end of the streamer as the towing force is removed therefrom, and
  (5) a plurality of negatively buoyant vehicles connected at the fore and aft portions thereof respectively to the streamer at regular intervals, each of said vehicles being sufficiently heavy when submerged to engage said bottom continuously as the vehicle moves therealong and having
  (6) means depending downwardly therefrom for furrowing the bottom thereby to increase the resistance of the streamer to lateral drift sufficiently to cause the streamer throughout the length thereof to be forcibly restrained from departure from the line defining the course of the vessel.

2. A system according to claim 1 wherein the negatively buoyant vehicles each comprises
  (1) a sled body having a pair of runners subjacent thereto constructed and arranged to support the vehicle and cut furrows within said bottom within which the runners are disposed.

3. A system according to claim 2 in which the sled body comprises
  (1) an elongated flat aft portion to which the runners are secured, and
  (2) an upwardly curved fore portion contiguous therewith, said fore portion being of decreasing cross section and provided with a pointed end portion having
  (3) means for establishing connection to a line connecting the fore portion to the streamer.

4. A system for seismic surveying of subaqueous structures comprising
  (1) an elongated positively buoyant flexible streamer cable having a plurality of detecting devices disposed at intervals therein,
  (2) a tow cable connected to the head end of the streamer for effecting a towing connection to a moving vessel,
  (3) means on the vessel for applying a towing force to said tow cable while the vessel is moving along a course and for releasing said towing force at will,
  (4) a depressor connected to said tow cable at the head end of the streamer cable for maintaining the head end of the streamer near the bottom of a body of water while the streamer is being towed and for anchoring the head end of the streamer as the towing force is released therefrom, and
  (5) a plurality of negatively buoyant bottom grooving vehicular devices having the fore and aft ends thereof respectively connected at intervals throughout the length of the streamer, each of said devices being sufficiently heavy when submerged to maintain the devices in continuous contact with said bottom thereby rendering the streamer sufficiently resistive to the pull of cross currents as to cause the streamer to be disposed continuously throughout the length thereof within a line defining the course of the towing vessel.

5. A system according to claim 4 wherein the bottom grooving vehicular devices each comprises
  (1) a sled having a pair of runners constructed and arranged to support the sled on the bottom of a body of water and to create furrows as said sled is moved along the bottom which engage the trailing portion of the runners sufficiently to prevent lateral drift as the result of a cross current acting on the streamer and sleds.

6. A system according to claim 4 in which the vehicular devices each is provided with
  (1) four wheels for rolling engagement with the bottom of a body of water, said wheels being constructed and arranged to form grooves in said bottom when the bottom is sufficiently soft.

7. A positively buoyant flexible elongated seismic cable constructed and arranged to be towed beneath the surface of a body of water and having
  (1) a plurality of having wagon like devices continuously engaging the bed of the body of water within which the cable is submerged and connected to said cable at intervals throughout the length thereof whereby the cable is forcibly restrained from drifting downstream under the influence of a cross current,
  (2) a pair of towing connections on the fore and aft end portions of each of said devices and,
  (3) each of said devices having a pair of lines respectively connected to said towing connections and to said cable for applying a towing force to each of the devices.

8. A cable according to claim 7 in which the wheels of each of said wagon like devices are configured to cut into and furrow the bed sufficiently to prevent lateral movement of the device as the devices are moved therealong.

9. A cable according to claim 8 including
  (1) a weighted depressor secured to the forward end of the cable and constructed and arranged to engage the bed and anchor the forward end of the cable when the towing force is removed therefrom.

10. In a waterborne system for seismic prospecting for geological structures disposed beneath a body of water, in combination,
  (1) a positively buoyant elongated flexible streamer having a plurality of detecting devices disposed at intervals therein,
  (2) a flexible lead-in cable connected to the head end of the streamer for effecting a towing connection to a moving vessel,
  (3) means on the vessel for applying a towing force to said connection while the vessel is moving along a course and for removing said towing force at will,
  (4) a depressor connected to said cable at the head end of the streamer for maintaining the head end of the streamer near the bottom of the body of water while the streamer is being towed, said depressor having sufficient mass to sink and anchor the head end of the streamer as the towing force is removed therefrom, and
  (5) a plurality of negatively buoyant vehicles connected at the fore and aft portions thereof respectively to the streamer at regular intervals, each of said vehicles engaging said bottom continuously as the vehicle moves therealong and having
  (6) means furrowing the bottom thereby to increase the resistance of the streamer to lateral drift sufficiently to cause the streamer throughout the length thereof to be forcibly restrained from departure from the line defining the course of the vessel,
  (7) each of said negatively buoyant vehicles comprising a sled body having a pair of runners subjacent thereto constructed and arranged to cut furrows within said bottom within which the runners are disposed,
  (8) the sled body comprising an elongated flat aft portion to which the runners are secured, and
  (9) an upwardly curved fore portion contiguous therewith, said fore portion being of decreasing cross section and provided with a pointed end portion having

(10) means for establishing connection to a line connection to a line connecting the fore portion to the streamer, and the aft portion is provided with

(11) means for establishing connection to a second line connecting the aft portion to the streamer.

11. In a waterborne system for seismic prospecting for geological structures disposed beneath a body of water, in combination, (1) a positively buoyant elongated flexible streamer having a plurality of detecting devices disposed at intervals therein, (2) a flexible lead-in cable connected to the head end of the streamer for effecting a towing connection to a moving vessel, (3) means on the vessel for applying a towing force at will to said connection while the vessel is moving along a course and for removing said towing force at will, (4) a depressor connected to said cable at the head end of the streamer for maintaining the head end of the streamer near the bottom of the body of water while the streamer is being towed, said depressor having sufficient mass to sink and anchor the head end of the streamer as the towing force is removed therefrom, and (5) a plurality of negatively buoyant vehicles connected at the fore and aft portions thereof respectively to the streamer at regular intervals, each of said vehicles engaging said bottom continuously as the vehicle moves therealong and having (6) means furrowing the bottom thereby to increase the resistance of the streamer to lateral drift sufficiently to cause the streamer throughout the length thereof to be forcibly restrained from departure from the line defining the course of the vessel, (7) each of the negatively buoyant vehicles comprising a wagon body having an elongated generally rectangular flat aft portion and (8) an upwardly curved fore portion contigous therewith, (9) a plurality of wheels respectively mounted near the corners of said flat portion for rotation about axes transverse to the flat body portion, and

(10) means at the fore and aft portions respectively for attaching a pair of lines thereto thereby to establish a connection to said streamer.

12. A system according to claim 11 in which each of said wheels is provided with (1) a flange like tread for cutting a groove in said bottom and thereby increasing the resistance to sidewise drag caused by a cross current.

References Cited by the Examiner

UNITED STATES PATENTS

| | | | |
|---|---|---|---|
| 982,709 | 1/1911 | Eacrett | 114—55 |
| 1,349,311 | 8/1920 | Asman | 280—8 |
| 2,142,136 | 1/1939 | Lawton | 37—54 |
| 2,541,135 | 2/1951 | Wade | 280—8 |
| 2,729,300 | 1/1956 | Pasley et al. | 181—.5 |
| 2,738,488 | 3/1956 | MacKnight | 181—.5 |

BENJAMIN A. BORCHELT, *Primary Examiner.*

SAMUEL FEINBERG, *Examiner.*

W. KUJAWA, *Assistant Examiner.*